H. SPILLMANN.
LATHE CHUCK.
APPLICATION FILED SEPT. 28, 1918.
1,350,746.
Patented Aug. 24, 1920.
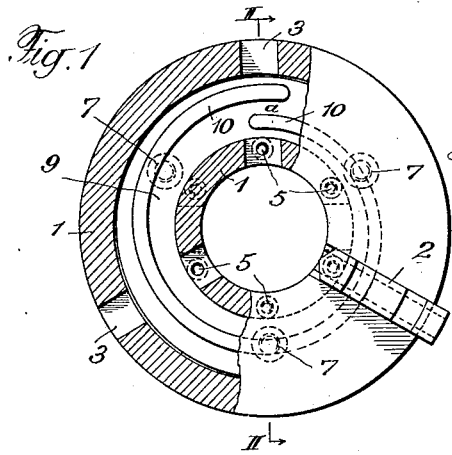
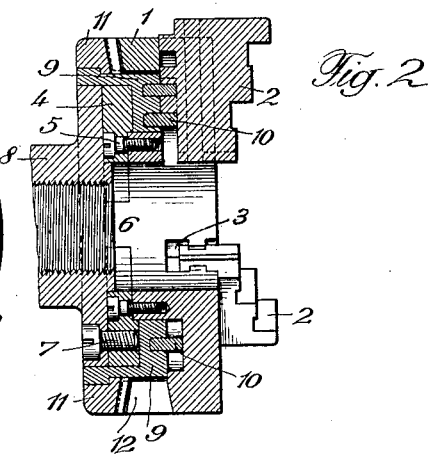
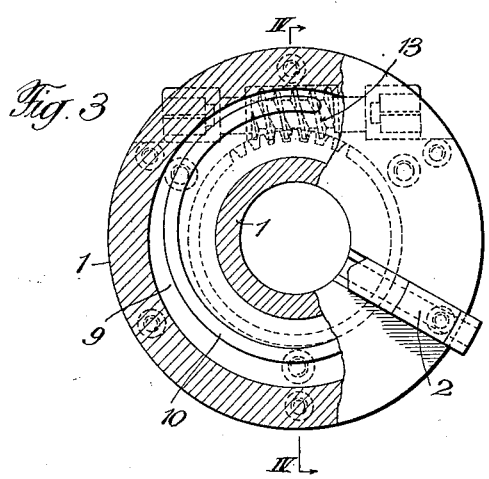
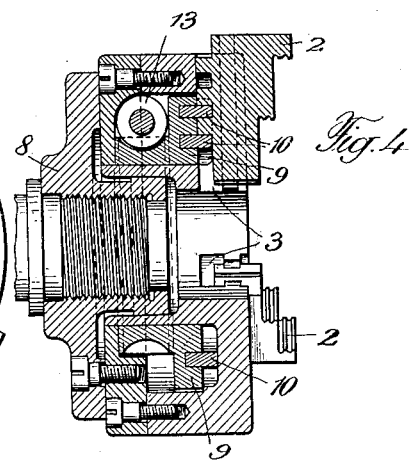
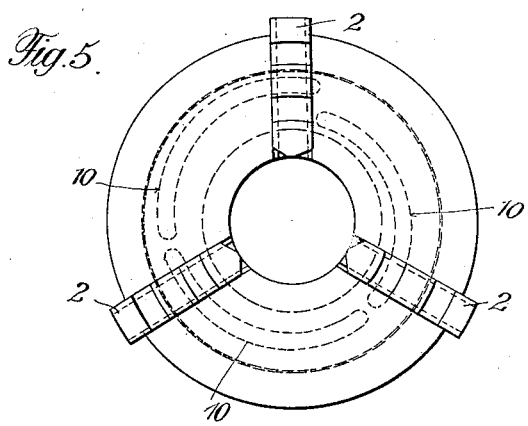
Inventor:
Heinrich Spillmann,
By
Atty

UNITED STATES PATENT OFFICE.

HEINRICH SPILLMANN, OF ZURICH, SWITZERLAND.

LATHE-CHUCK.

1,350,746.  Specification of Letters Patent.  Patented Aug. 24, 1920.

Application filed September 28, 1918. Serial No. 256,052.

*To all whom it may concern:*

Be it known that I, HEINRICH SPILLMANN, a citizen of the Republic of Switzerland, residing at Zurich, Weinbergstrasse 145, Switzerland, have invented certain new and useful Improvements in Lathe-Chucks; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to an improved lathe chuck in which the movement of the clamping jaws is effected by one or more pieces having a guide curve, said pieces being inserted into corresponding grooves of a rotary plate.

This invention will now be more particularly described with reference to the accompanying drawings illustrating constructional examples of the invention.

In these drawings:

Figure 1 is a front elevation, partly in section, of a first embodiment of the invention, Fig. 2 is a cross-section on the line II—II of Fig. 1, Fig. 3 is a front elevation, partly in section, of a second embodiment, Fig. 4 is a cross-section on the line IV—IV of Fig. 3 and Fig. 5 is a front view of a chuck having for each clamping jaw a separate guide piece coöperating therewith.

Referring at first to Figs. 1 and 2, the chuck comprises a casing 1 provided with radial guide grooves 3 for the clamping jaws 2. A driving plate 4 is fixed to the hub of the casing 1 by means of screws 5. Two projections 6 on the hub of the casing engage corresponding recesses in the plate 4 and are for relieving the screws 5 from the shearing stresses. The plate 4 is connected by means of screws 7 to a flange 8. The hub of the latter is screw-threaded in order that the whole chuck may be secured to the spindle of a machine tool. On the hub of the casing 1 is also rotatably mounted a plate 9 provided with a groove into which is removably inserted a curved guide 10. The guide 10 is made preferably of a material having a very high grade of hardness and it engages into the teeth of the clamping jaws 2. To the hub of the plate 9 is fixed a toothed rim 11. The rotary movement of the plate 9 and of the toothed rim 11 mounted thereon is brought about by means of a toothed wrench or key adapted to be inserted into a hole 12 of the casing 1 in order to be brought into engagement with the toothed rim 11.

In the embodiment shown in Figs. 3 and 4 the revolving movement of the plate 9 is effected by means of a worm 13 engaging into a portion of the plate 9 having the shape of a worm wheel. For the present invention it is not material if the movement of all clamping jaws is effected only by a single curved guide 10, or if the movement of the clamping jaws is brought about by a plurality of curved guides of any suitable kind, each of which actuates one of the clamping jaws (Fig. 5).

In a chuck of the design hereinbefore described, the curved guide 10 engages with the exception of those overlapping portions lying near its ends, *i. e.* at *a*, only into one space between teeth of the clamping jaws. The spaces of the teeth of the clamping jaws have consequently practically the same shape and can be easily machined. The contact in the slide surfaces between the flank of the tooth of the clamping jaws and the curved guide 10 is effected advantageously on the one hand by materials having a very high degree of hardness and on the other hand by relatively large and exactly machined surfaces. Moreover, the piece 10 is interchangeable. The wear of the parts of the chuck subjected to the greatest stress is reduced in the construction hereinbefore described to a minimum, and owing to the fact that the curved guide 10 is interchangeable, such a piece, when worn out, can be replaced in a very simple manner.

Not only are the wear parts reduced and made interchangeable, but what is also of importance, it is thus permissible to make these parts extremely hard without affecting other parts of the chuck. When the curved guides are formed as a part of another plate or element of the chuck, the hardening, after making the plate distorts it, so that it no longer fits. By making the guides separate, they can be tempered to any degree and then touched up to fit on the grinding wheel while this would not be possible on the configured part that holds the guide.

What I claim now as my invention is:

A lathe chuck comprising a circular casing having radial grooves and a central hub, a driving plate secured to said hub, a machine surfaced plate revolubly mounted on said hub and having a flat spiral groove in its face, a spiral guide of harder metal in said groove, clamping jaws radially movable in the grooves of said casing and having teeth engaging said guide, and means to rotate said grooved plate.

In testimony that I claim the foregoing as my invention, I have signed my name.

HEINRICH SPILLMANN.